UNITED STATES PATENT OFFICE.

ALBERT M. FULLER, OF ST. PAUL, MINNESOTA, ASSIGNOR OF ONE-HALF TO HARVEY B. FULLER, OF SAME PLACE.

WALL-CLEANING COMPOUND.

SPECIFICATION forming part of Letters Patent No. 634,497, dated October 10, 1899.

Application filed February 3, 1896. Renewed March 30, 1899. Serial No. 711,172. (No specimens.)

*To all whom it may concern:*

Be it known that I, ALBERT M. FULLER, of St. Paul, Ramsey county, Minnesota, have invented certain Improvements in Detergent Compounds, of which the following is a specification.

My invention relates to improvements in detergent compounds designed for the dry-cleaning of walls, its object being to provide a composition which is not subject to deterioration, but may be kept unimpaired for an indefinite period and easily and quickly made ready for use without the application of heat.

To this end my invention consists of a dry powder prepared by grinding the residue obtained after evaporating the water from a mass consisting of water, flour, or similar starchy material, and a suitable chemical salt or alkali, preferably sodium carbonate, although other salts and alkalies—such as sodium sulfate, magnesium sulfate, potassium carbonate, and sodium hydrate—may be employed in lieu thereof, but less efficiently. These ingredients are compounded in substantially the proportions and manner following: The preferred proportions, which, however, may be varied somewhat, are about 56.4 parts of flour, 42.3 parts of water, and 1.3 parts crystallized sodium carbonate. When a neutral salt is used, its relative quantity should be about double, and when a salt or alkali containing no water of crystallization is used its amount should be correspondingly less. If a caustic alkali is used, its proportion should be about .25, the amount of the other ingredients being proportionately increased. I first mix these ingredients into a dough or pasty mass and then heat the same until the water is absorbed by the starch-granules and the mass is no longer sticky. It is then thoroughly dried and made ready for the market by grinding the residue to powder. When desired to prepare the same for use, a sufficient quantity of powder is mixed with about its weight of cold water, thus reducing it to a plastic mass. The alkaline or saline ingredient is added to render the mass somewhat friable and is an essential element, as it serves to make the consistency of the composition such that when it is rubbed over a wall or similar surface minute rolls are formed and separated from the mass by the friction. These rolls in being formed combine with or adhere to the dust particles upon the surface to which the composition is applied, carrying these particles away with them as the rolls fall from the mass.

Without the addition of an alkali or saline ingredient to make the composition of the consistency described, when the mass is rubbed over the wall its surface does not wear away in the form of minute rolls, as described, but becomes glazed over and worthless for cleaning purposes. There are certain salts which are not suitable for use as the saline ingredient. For example, sodium chlorid, alum, aluminium sulfate, and potassium nitrate will not produce the desired effect. I therefore employ and wish to cover in this patent the use only of such salts and alkalies as will produce a composition of the described consistency.

I claim—

1. The powder made by grinding the residue obtained by evaporating the water from a cooked mass, consisting of a suitable starchy material, a suitable salt or alkali as specified, and water, substantially in the proportions specified.

2. The powder, made by grinding the residue obtained by evaporating the water from a cooked mass, consisting of a starchy material, a suitable alkali or alkaline salt as specified, and water, substantially in the proportions specified.

3. The powder made from a mass consisting of flour, a suitable salt or alkali as specified, and water, which has been first heated, and then dried, and pulverized.

4. A detergent compound consisting of a plastic mass, made by mixing with cold water a powder made by grinding the residue obtained by evaporating the water from a cooked mass consisting of flour, a suitable salt or alkali as specified, and water, in substantially the proportions specified.

In testimony whereof I affix my signature in presence of two witnesses.

ALBERT M. FULLER.

Witnesses:
H. S. JOHNSON,
MINNIE L. THAUWALD.